United States Patent
Hotta et al.

(10) Patent No.: US 12,546,620 B2
(45) Date of Patent: Feb. 10, 2026

(54) VEHICLE DISPLAY CONTROL DEVICE, VEHICLE DISPLAY CONTROL SYSTEM, VEHICLE, VEHICLE DISPLAY CONTROL METHOD, AND NON-TRANSITORY STORAGE MEDIUM STORING A PROGRAM

(71) Applicant: TOYOTA JIDOSHA KABUSHIKI KAISHA, Toyota (JP)

(72) Inventors: Norihisa Hotta, Nagoya (JP); Toshinori Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 305 days.

(21) Appl. No.: 18/340,941

(22) Filed: Jun. 26, 2023

(65) Prior Publication Data
US 2024/0003702 A1 Jan. 4, 2024

(30) Foreign Application Priority Data
Jun. 29, 2022 (JP) ................ 2022-104957

(51) Int. Cl.
| G01C 21/36 | (2006.01) |
| B60K 35/23 | (2024.01) |
| B60K 35/29 | (2024.01) |
| B60K 35/28 | (2024.01) |
| B60K 35/81 | (2024.01) |

(52) U.S. Cl.
CPC ............ *G01C 21/365* (2013.01); *B60K 35/23* (2024.01); *B60K 35/28* (2024.01); *B60K 35/29* (2024.01); *B60K 35/81* (2024.01); *B60K 2360/166* (2024.01); *B60K 2360/195* (2024.01)

(58) Field of Classification Search
CPC ........ B60K 2360/166; B60K 2360/195; B60K 35/00; B60K 35/23; B60K 35/28; B60K 35/29; B60K 35/81
See application file for complete search history.

(56) References Cited

U.S. PATENT DOCUMENTS

2020/0312146 A1* 10/2020 Tanaka .................. G02B 27/01

FOREIGN PATENT DOCUMENTS

| JP | 2016114970 A | * | 6/2016 |
| JP | 2017-021019 A | | 1/2017 |
| JP | 2020159953 A | | 10/2020 |

* cited by examiner

*Primary Examiner* — Charles J Han
(74) *Attorney, Agent, or Firm* — Dickinson Wright, PLLC

(57) ABSTRACT

A vehicle display control device includes: a processor, the processor being configured to: acquire relay point information related to a plurality of relay points that have been set at intervals along a planned travel route of a vehicle; and display, so as to be superimposed on a foreground in a display region provided in front of an occupant, an image directed toward a planned path change point along an imaginary line connecting the relay points.

8 Claims, 6 Drawing Sheets

VEHICLE DISPLAY CONTROL DEVICE, VEHICLE DISPLAY CONTROL SYSTEM, VEHICLE, VEHICLE DISPLAY CONTROL METHOD, AND NON-TRANSITORY STORAGE MEDIUM STORING A PROGRAM

CROSS-REFERENCE TO RELATED APPLICATION

This application is based on and claims priority under 35 USC 119 from Japanese Patent Application No. 2022-104957 filed on Jun. 29, 2022, the disclosure of which is incorporated by reference herein.

BACKGROUND

Technical Field

The present disclosure relates to a vehicle display control device, a vehicle display control system, a vehicle, a vehicle display control method, and a non-transitory storage medium storing a program.

Related Art

Japanese Patent Application Laid-Open (JP-A) No. 2017-21019 discloses a vehicle display device that displays an image on a windshield using a head-up display device. In this vehicle display device, a guidance point at which a vehicle turns is detected, and guidance marks are displayed so as to be superimposed on a road surface before and after the guidance point.

However, in the device described in JP-A No. 2017-21019, an occupant cannot intuitively grasp a route to a planned path change point at which a path of the vehicle is changed, and there is room for improvement.

SUMMARY

The present disclosure provides a vehicle display control device, a vehicle display control system, a vehicle, a vehicle display control method, and a non-transitory storage medium storing a program that enable an occupant to intuitively grasp a path of a vehicle.

A vehicle display control device according to a first aspect includes: a relay point information acquisition section that acquires relay point information related to a plurality of relay points that have been set at intervals along a planned travel route of a vehicle; and an image display section that displays, so as to be superimposed on a foreground in a display region provided in front of an occupant, an image directed toward a planned path change point along an imaginary line connecting the relay points.

In the vehicle display control device according to the first aspect, the image directed toward the planned path change point is displayed so as to be superimposed in the display region provided in front of the occupant. This enables the occupant to recognize the planned path change point.

Further, since the image is displayed, so as to be superimposed, so as to be directed toward the planned path change point along the imaginary line connecting the plurality of relay points that have been set at intervals along the planned travel route, the occupant can intuitively recognize a route to the planned travel route. It should be noted that the term "display so as to be superimposed" as used herein is not limited to a configuration in which superimposed display is carried out with respect to a foreground that is visible through a windshield glass, but rather is a concept that broadly encompasses configurations in which an image is displayed so as to be superimposed on a foreground displayed on a display or the like inside the vehicle cabin. Further, the term "planned path change point" as used herein refers to a point on the planned travel route of the vehicle at which a path change, such as a right or left turn, a lane change or the like, is planned.

A vehicle display control device according to a second aspect is the vehicle display control device according to the first aspect, wherein the relay point information acquisition section deletes a portion of the relay point information in a case in which a total data size of the acquired relay point information exceeds a predetermined data size.

In the vehicle display control device according to the second aspect, since the total data size of the relay point information does not exceed the predetermined data size, other information processing performed at the vehicle is not affected.

A vehicle display control device according to a third aspect is the vehicle display control device according to the second aspect, which includes a priority setting section that sets degrees of priority of the relay point information that has been acquired by the relay point information acquisition section, wherein the relay point information acquisition section deletes the relay point information in order from relay point information having a lowest degree of priority.

In the vehicle display control device according to the third aspect, since the relay point information acquisition section deletes the relay point information in order from relay point information having the lowest degree of priority, deletion of important information for displaying the image can be suppressed.

A vehicle display control device according to a fourth aspect is the vehicle display control device according to the third aspect, wherein the priority setting section sets a degree of priority of relay point information for before and after the planned path change point to be high.

In the vehicle display control device according to the fourth aspect, the relay point information for before and after the planned path change point is less likely to be deleted. This enables the accurate image to be reliably displayed before and after the planned path change point.

A vehicle display control device according to a fifth aspect is the vehicle display control device according to the first aspect, wherein the display region is a portion of a windshield glass onto which the image is projected by a head-up display device.

In the vehicle display control device according to the fifth aspect, since the image is projected onto the windshield glass, the occupant can recognize the route to the planned path change point without significantly moving their line of sight, which is directed toward a front of the vehicle.

A vehicle display control system according to a sixth aspect includes: the vehicle display control device according to any one of the first aspect to the fifth aspect; and a display device that displays the image in the display region.

A vehicle according to a seventh aspect includes the vehicle display control system according to the sixth aspect.

A vehicle display control method according to an eighth aspect includes, by a processor: acquiring relay point information related to a plurality of relay points that have been set at intervals along a planned travel route of a vehicle; and displaying, so as to be superimposed on a foreground in a display region provided in front of an occupant, an image directed toward a planned path change point along an imaginary line connecting the relay points.

A non-transitory storage medium according to a ninth aspect stores a program that is executable by a computer to perform processing that includes: acquiring relay point information related to a plurality of relay points that have been set at intervals along a planned travel route of a vehicle; and displaying, so as to be superimposed on a foreground in a display region provided in front of an occupant, an image directed toward a planned path change point along an imaginary line connecting the relay points.

As explained above, the vehicle display control device, the vehicle display control system, the vehicle, the vehicle display control method, and the non-transitory storage medium storing a program according to the present disclosure enable an occupant to intuitively grasp the path of the vehicle.

BRIEF DESCRIPTION OF THE DRAWINGS

Exemplary embodiment of the present disclosure will be described in detail based on the following figures, wherein.

DETAILED DESCRIPTION

A vehicle display system 10 including a vehicle display control device 28 according to an exemplary embodiment will be explained, with reference to the drawings. It should be noted that the arrow UP illustrated in FIG. 1 indicates an upper side in a vehicle up-down direction, and that the arrow RH indicates a right side in a vehicle width direction. The up-down direction and the left-right direction in the following explanation respectively mean up and down in the vehicle up-down direction and left and right in the vehicle width direction.

Figure 1:
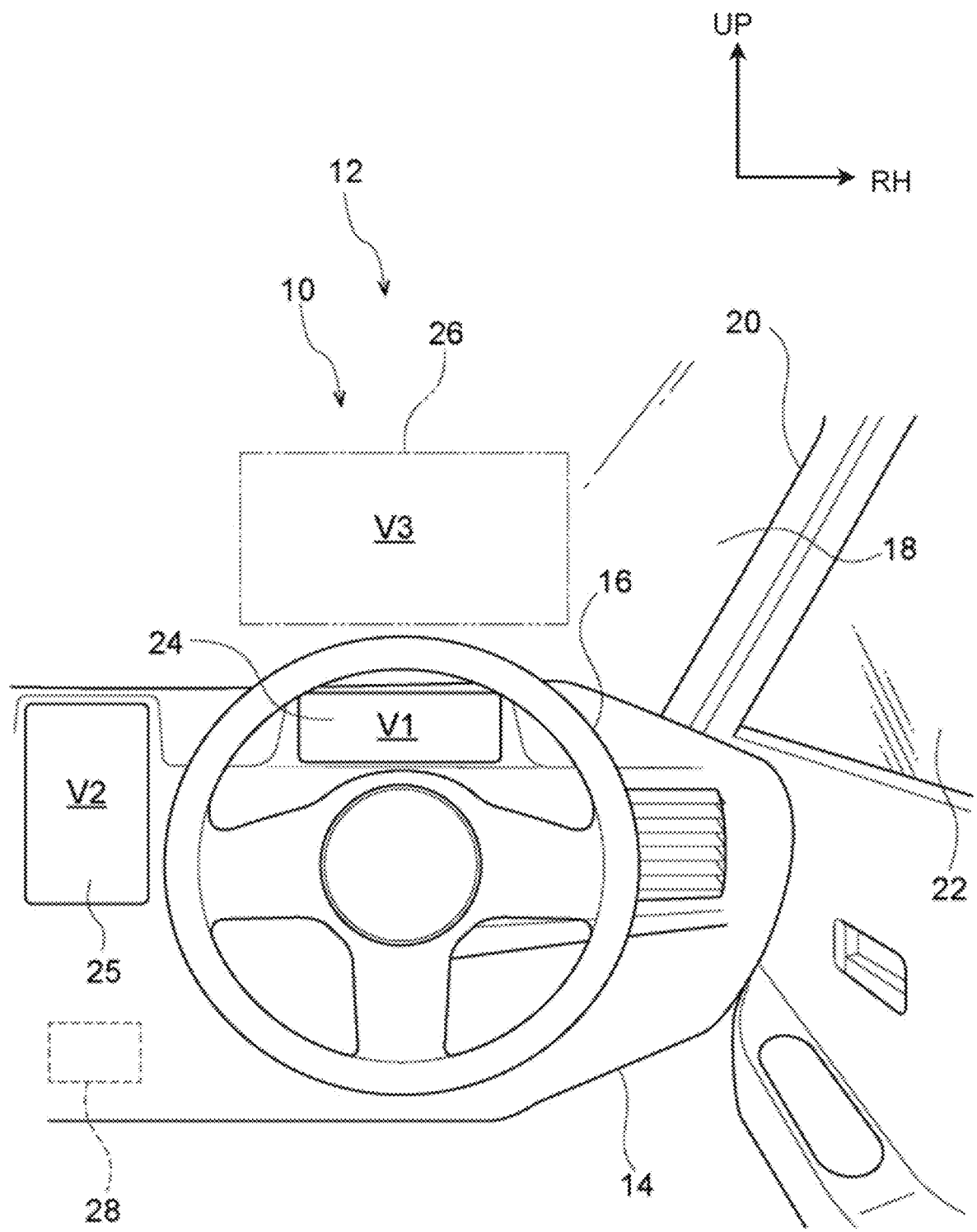
FIG. 1 is a schematic diagram illustrating a front portion within a vehicle cabin, viewed from a vehicle rearward side, in a vehicle to which a vehicle display device according to the exemplary embodiment has been applied.

As illustrated in FIG. 1, an instrument panel 14 is provided at a front portion within a vehicle cabin in a vehicle 12. The instrument panel 14 extends in the vehicle width direction, and a steering wheel 16 is provided at a vehicle right side of the instrument panel 14. Namely, in the present exemplary embodiment, as an example, the vehicle is configured as a right-hand drive vehicle in which the steering wheel 16 is provided at the right side, and a driver's seat is set at the vehicle right side.

A windshield glass 18 is provided at a front end portion of the instrument panel 14. The windshield glass 18 extends in the vehicle up-down direction and in the vehicle width direction to partition a vehicle cabin interior and a vehicle cabin exterior.

A vehicle right side end portion of the windshield glass 18 is fixed at a front pillar 20 on the vehicle right side. The front pillar 20 extends in the vehicle up-down direction, and the windshield glass 18 is fixed at a vehicle width direction inner side end portion of the front pillar 20. Further, a front end portion of a front side glass 22 is fixed at a vehicle width direction outer side end portion of the front pillar 20. It should be noted that a vehicle left side end portion of the windshield glass 18 is fixed at a front pillar on the vehicle left side, which is not illustrated in the drawings.

A first display section 24 including an image display region V1 is provided at the instrument panel 14. The first display section 24 is configured by a meter display provided at a vehicle front side of the driver's seat on a vehicle right side of the instrument panel 14. The first display section 24 is connected to various meter devices installed at the vehicle 12, and is provided at a position that enters a field of view in a state in which a driver directs their line of sight toward a front of the vehicle.

A second display section 25 including an image display region V2 is provided at the instrument panel 14. The second display section 25 is configured by a center display disposed at a central portion of the instrument panel 14 in the vehicle width direction.

A third display section 26 having an image display region V3 is provided at the windshield glass 18. The third display section 26 is set at a vehicle upper side of the first display section 24, and is configured by a projection surface onto which a head-up display device 46 (refer to FIG. 2), serving as a display device, projects. More specifically, the head-up display device 46, which is capable of projecting an image, is provided at a vehicle front side of the instrument panel 14, and the head-up display device 46 is configured so as to project an image from the head-up display device 46 onto the third display section 26 of the windshield glass 18. Namely, the third display section 26 is configured as a part of the windshield glass 18 serving as a projection surface of the head-up display device 46.

The vehicle display control device 28 configuring the vehicle display system 10 is provided at the vehicle 12. The vehicle display control device 28 of the present exemplary embodiment is, for example, an electronic control unit (ECU) that performs various control.

Hardware Configuration of Vehicle Display Control Device 28

Figure 2:
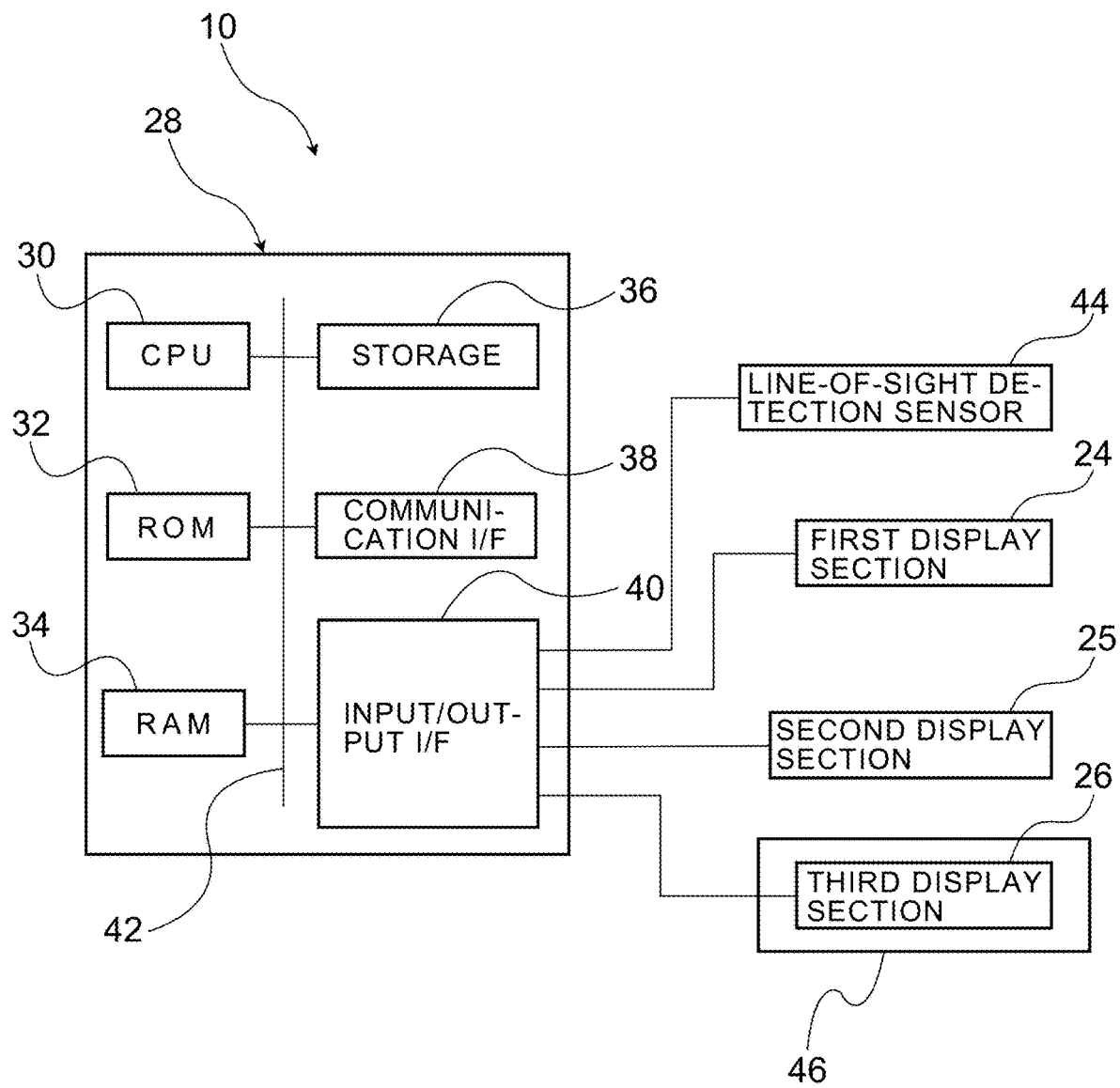
FIG. 2 is a block diagram illustrating a hardware configuration of a vehicle display control device according to the exemplary embodiment.

As illustrated in FIG. 2, the vehicle display control device 28 is configured to include a central processing unit (CPU; serving as a processor) 30, a read only memory (ROM) 32, a random access memory (RAM) 34, a storage 36, a communication interface (communication I/F) 38, and an input/output interface (input/output I/F) 40. These configurations are connected via an internal bus 42 so as to be capable of communicating with each other.

The CPU 30 is a central arithmetic processing unit, and the CPU 30 executes various programs and controls various sections. Namely, the CPU 30 reads out a program from the ROM 32 or the storage 36, and executes the program using the RAM 34 as a workspace. Further, the CPU 30 carries out control of the aforementioned respective configurations and various kinds of arithmetic processing according to programs recorded in the ROM 32 or the storage 36.

The ROM 32 stores various programs and various data. The RAM 34 serves as a workspace to temporarily store programs and data. The storage 36 is configured by a hard disk drive (HDD) or a solid state drive (SSD), and is a non-transitory recording medium that stores various programs including an operating system, as well as various data. In the present exemplary embodiment, a display program or the like for performing image display processing, relay point information acquisition processing, and the like is stored in the ROM 32 or the storage 36.

The communication OF 38 is an interface for allowing the vehicle display control device 28 to communicate with a server and other devices, and, for example, employs a standard such as a Controller Area Network (CAN), Ethernet (registered trademark), Long Term Evolution (LTE), Fiber Distributed Data Interface (FDDI), Wi-Fi (registered trademark), or the like. A line-of-sight detection sensor 44, the first display section 24, the second display section 25, and the head-up display device 46 are connected to the input/output interface 38. Further, an image is projected onto the third display section 26 by the head-up display device 46.

The line-of-sight detection sensor 44 is provided, for example, at the instrument panel 14, and is disposed facing a face of an occupant (driver) seated in the driver's seat. Then, by recognizing an eye of the occupant, the line-of-sight detection sensor 44 detects a line-of-sight direction of the occupant using a principle such as a corneal reflection method, a scleral reflection method, or the like.

Functional Configuration of Vehicle Display Control Device 28

The vehicle display control device 28 implements various functionality using the aforementioned hardware resources. Functional configuration implemented by the vehicle display control device 28 will be explained, with reference to FIG. 3.

Figure 3:
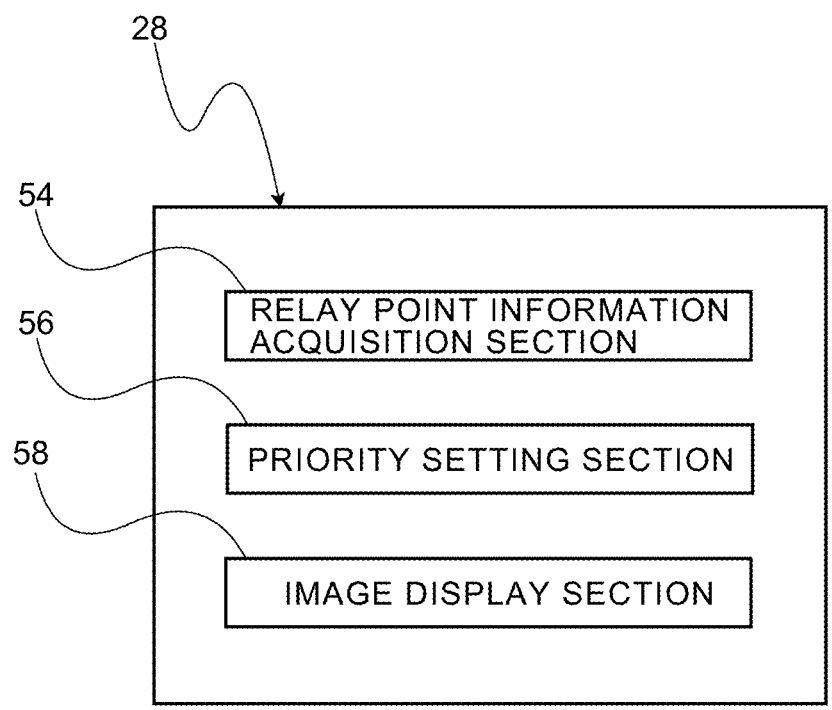
FIG. 3 is a block diagram illustrating a functional configuration of the vehicle display control device according to the exemplary embodiment.

As illustrated in FIG. 3, the vehicle display control device 28 is configured to include a relay point information acquisition section 54, a priority setting section 56, and an image display section 58 as functional configuration. It should be noted that the respective functional configuration is implemented by the CPU 30 reading out and executing programs stored in the ROM 32 or the storage 36.

The relay point information acquisition section 54 acquires relay point information related to plural relay points that have been set at intervals along a planned travel route of the vehicle 12. More specifically, in a case in which a destination has been set by a navigation system or the like, a planned travel route to the destination is set. Further, the relay point information acquisition section 54 acquires the relay point information under a predetermined condition in a state in which the vehicle 12 is traveling along the planned travel route that has been set. The relay points acquired by the relay point information acquisition section 54 will be explained, with reference to FIG. 4.

Figure 4:
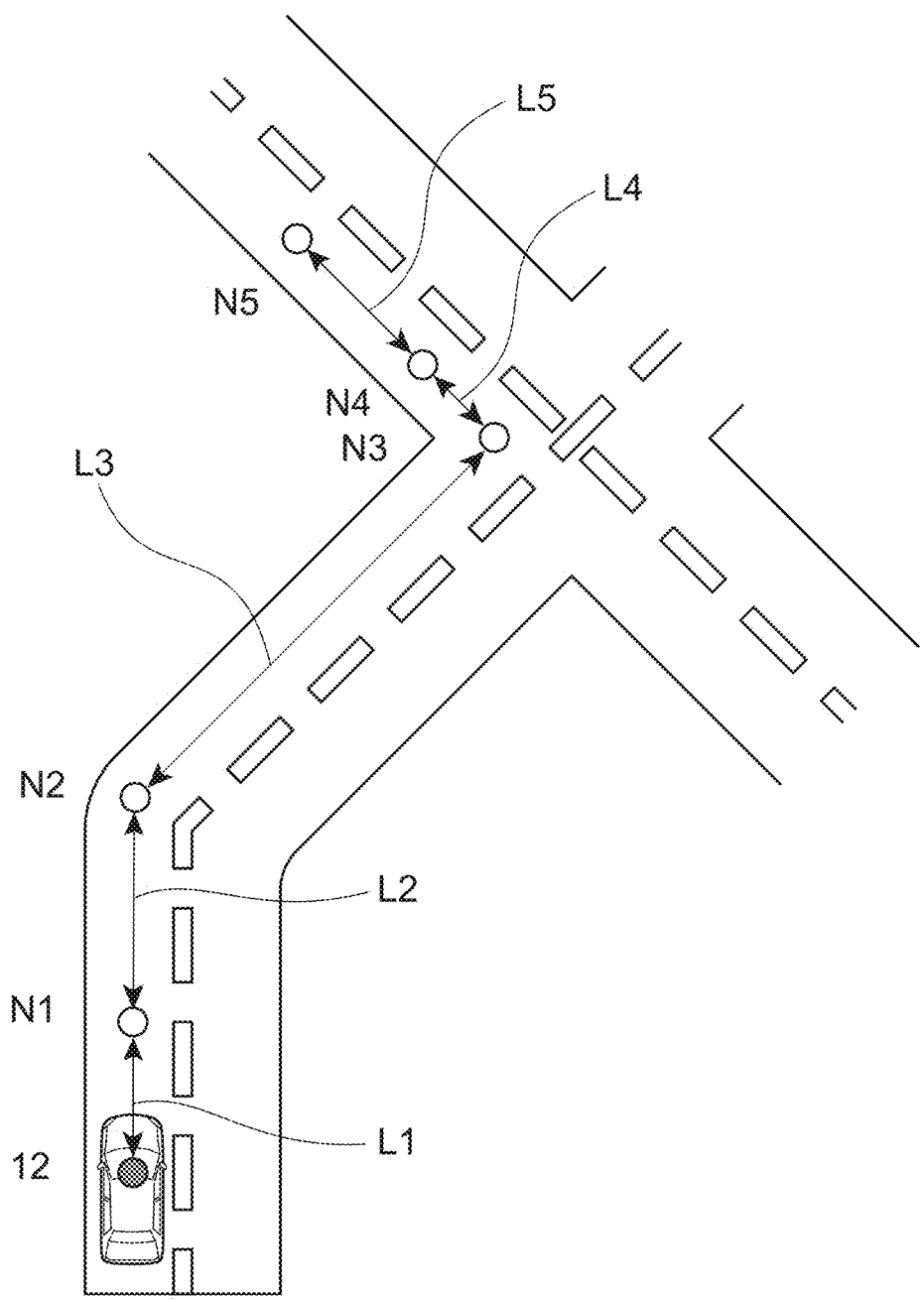
FIG. 4 is a schematic diagram for explaining relay points in the exemplary embodiment.

FIG. 4 is a schematic diagram illustrating the vehicle 12 and the planned travel route as viewed from above. As illustrated in FIG. 4, plural relay points N1 to N5 are set on the planned travel route of the vehicle 12. Further, the vehicle 12 and the relay point N1 are connected by a link L1 serving as a virtual line, and the relay point N1 and the relay point N2 are connected by a link L2 serving as a virtual line. Furthermore, the relay point N2 and the relay point N3 are connected by a link L3 serving as a virtual line, and the relay point N3 and the relay point N4 are connected by a link L4 serving as a virtual line. Moreover, the relay point N4 and the relay point N5 are connected by a link L5 serving as a virtual line.

In the present exemplary embodiment, the relay points and the links are set in advance over an entire area of map data held by the vehicle 12. Further, intervals between the relay points are not uniform, and the relay points are set as appropriate according to a shape of a road or the like. Furthermore, since the relay point N3 illustrated in FIG. 4 indicates an intersection at which the vehicle 12 turns left, the relay point N3 is a planned path change point at which a path of the vehicle 12 is changed.

Predetermined relay point information is respectively stored for the relay points N1 to N5 and the links L1 to L5. In the present exemplary embodiment, as an example, one item of relay point information is set for the link L1 and the relay point N1. Similarly, relay point information for the link L2 and the relay point N2, relay point information for the link L3 and the relay point N3, relay point information for the link L4 and the relay point N4, and relay point information for the link L5 and the relay point N5 are respectively set.

The respective relay point information includes, for example, information such as a road type, presence or absence of one-way traffic, a gradient, a road shape, a travel direction, a number of lanes, presence or absence of a median strip or the like. Furthermore, the relay point information acquisition section 54 acquires relay point information that has been set for before and after the relay point N3, which is a planned path change point. The relay point information acquisition section 54 of the present exemplary embodiment acquires the aforementioned five items of relay point information as the relay point information that has been set for before and after the relay point N3.

Further, in a case in which a total data size of the acquired relay point information exceeds a predetermined data size, the relay point information acquisition section 54 of the present exemplary embodiment deletes a portion of the relay point information. More specifically, the relay point information acquisition section 54 deletes the relay point information in order from relay point information having a lowest degree of priority. The degrees of priority of the relay point information are set by the priority setting section 56.

The priority setting section 56 illustrated in FIG. 3 sets the degrees of priority of the relay point information acquired by the relay point information acquisition section 54. More specifically, the priority setting section 56 of the present exemplary embodiment sets a degree of priority of relay point information for before and after the planned path change point to be high. In the case of the example illustrated in FIG. 4, a degree of priority of the relay point information that has been set for before and after the relay point N3, which is the planned path change point, is set to be higher than other degrees of priority. Namely, the two items of relay point information of the relay point information of the link L3, which enters the relay point N3, and the relay point N3, and of the relay point information of the link L4, which exits from the relay point N3, and the relay point N4, are set to have the highest degree of priority.

Further, the priority setting section 56 sets a degree of priority of the relay point information of the link L2 and the relay point N2 to be next highest to that of the aforementioned two items of relay point information. It should be noted that, in the present exemplary embodiment, the setting is carried out such that the predetermined data size will not be exceeded by only the two items of relay point information that have been set to have the highest degree of priority.

The image display section 58 displays, so as to be superimposed on a foreground in a display region provided in front of an occupant, an image directed toward the planned path change point along an imaginary line connecting the relay points. More specifically, in the example illustrated in FIG. 4, in a case in which the relay point information acquisition section 54 has acquired the aforementioned five items of relay point information, the image display section 58 displays, so as to be superimposed on the foreground, the image so as to be directed toward the relay point N3, which is the planned path change point, along an imaginary line connecting the relay points N1 to N5. Further, in the present exemplary embodiment, as an example, the image display section 58 displays the image in the display region V3 of the third display section 26. Furthermore, in order to display the image ahead of the line of sight of the occupant, the image display section 58 calculates a position at which to carry out the superimposed display based on the line-of-sight direction of the occupant that has been acquired from the line-of-sight detection sensor 44.

Figure 5:
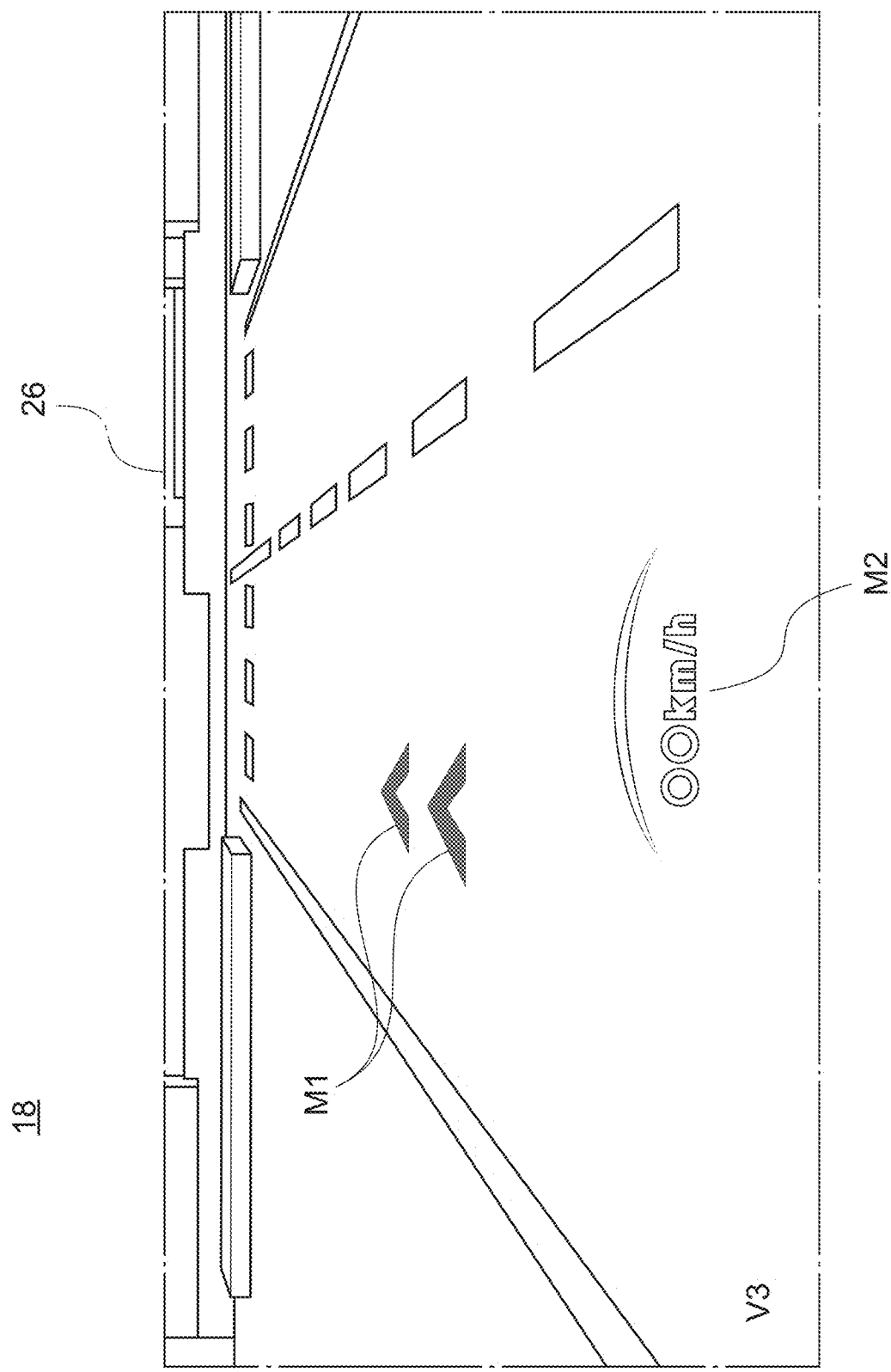
FIG. 5 is a diagram illustrating a display example of a display region in the exemplary embodiment.

FIG. 5 is a diagram illustrating a display example in which an image is displayed in the display region V3. As illustrated in FIG. 5, a view ahead of the vehicle is visible through the windshield glass 18 in the display region V3. It should be noted that, for simplicity of explanation, only the view that is visible in the display region V3 is illustrated in the drawing, but, in actuality, the view ahead of the vehicle is not delimited by the boundary of the third display section 26.

Two images M1 and M2 are displayed in the display region V3 by the head-up display device 46. The image display section 58 starts display of the image M1 at a point in time when a distance to the planned path change point has become equal to or less than a predetermined distance.

When an image display start point is passed through, the image display section 58 displays two of the image M1 in an animation so as to be directed toward the relay point N3 along the imaginary line as viewed from the occupant. Further, in FIG. 4, in a case in which the planned travel route is curved, such as at the relay point N2, the image M1 is displayed so as to be directed toward the relay point N3 while tracing a smooth curve along the planned travel route.

Furthermore, in a case in which data for a portion of the relay point information has been deleted by the relay point information acquisition section 54, the image display section 58 displays the image M1 based on the remaining relay point information, excluding the deleted relay point information. For example, in FIG. 4, in a case in which the relay point information for the link L5 and the relay point N5 has been deleted, since all of the relay point information up to the relay point N3 remains, this does not affect the animation of the image M1 displayed by the image display section 58.

Further, for example, in a case in which the relay point information for the link L1 and the relay point N1 has been deleted, the image display section 58 displays an animation of the image M1 based on the relay point information, excluding the relay point information for the link L1 and the relay point N1. In this case, since the virtual line connecting the relay points is a virtual line connecting the relay points N2, N3, N4, and N5, the image display section 58 displays the image M1 in an animation so as to be directed from the vehicle 12 toward the relay point N2. Namely, in this case, a virtual line connecting the vehicle 12 and the relay point N1 is not considered.

A current speed of the vehicle detected by a vehicle speed sensor, which is not illustrated in the drawings, is displayed by the mark M2. It should be noted that the mark M2 may not be displayed.

Operation

Next, operation of the present exemplary embodiment will be explained.

Image Display Processing

Figure 6:
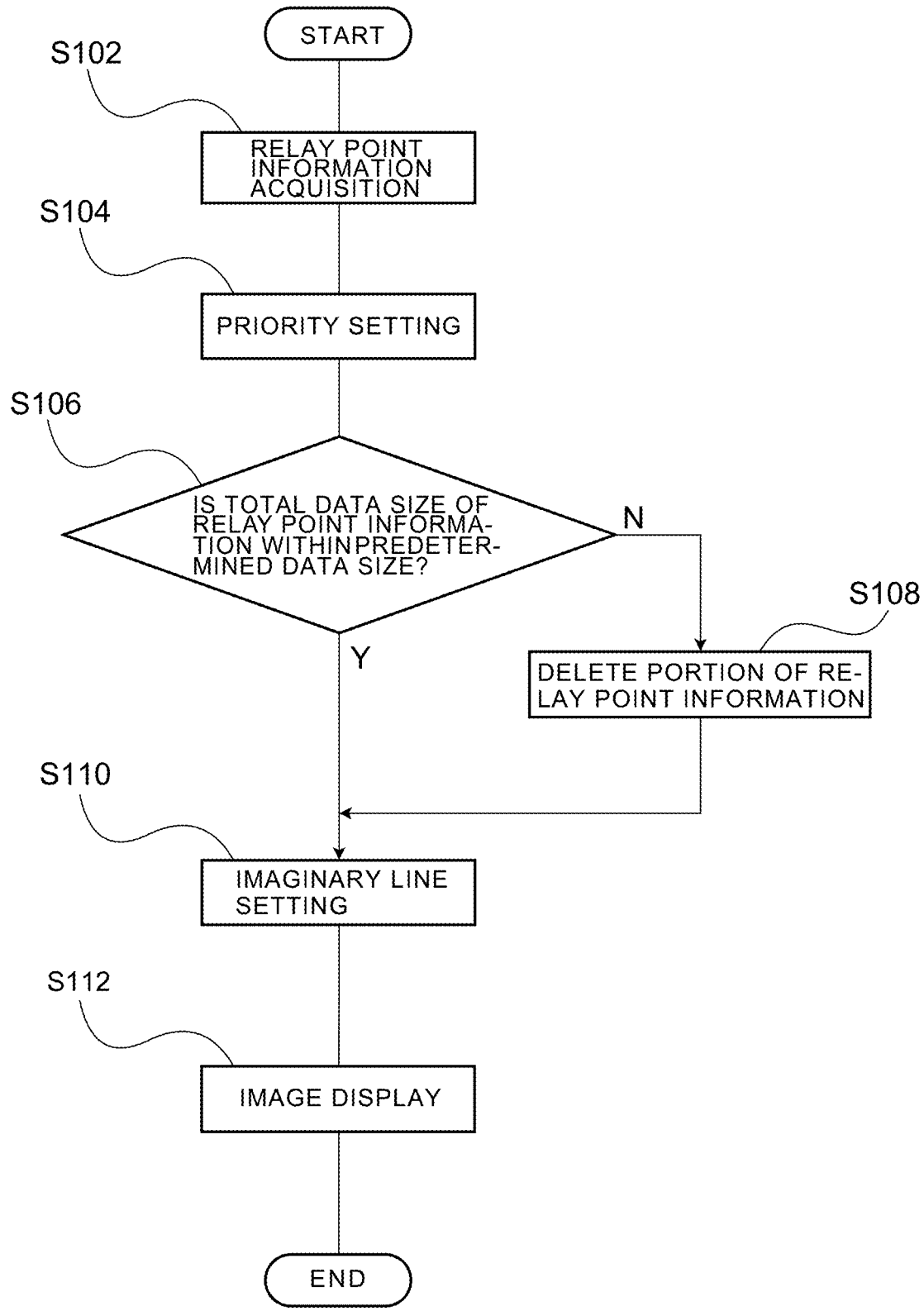
FIG. 6 is a flow chart illustrating an example of a flow of image display processing in the exemplary embodiment.

An example of image display processing for displaying the mark M1 at the third display section 26, which is the projection surface of the head-up display device 46, will be explained using the flowchart illustrated in FIG. 6. This image display processing is executed by the CPU 30 reading out the display program from the ROM 32 or the storage 36, and expanding and executing the display program in the RAM 34. Further, the image display processing is executed at a timing when the vehicle has approached the predetermined distance to the planned path change point.

At step S102, the CPU 30 acquires information for the relay points. More specifically, the CPU 30 acquires the relay point information that has been set for before and after the planned path change point, by the functionality of the relay point information acquisition section 54. It should be noted that the information for the relay points is stored in the map data held by the vehicle or in an external server.

At step S104, the CPU 30 sets the degrees of priority of the relay point information. More specifically, the CPU 30 sets the degrees of priority of the relay point information based on a predetermined rule, by the functionality of the priority setting section 56. For example, the priority setting section 56 sets the degree of priority of the relay point information for before and after the planned path change point to be high.

At step S106, the CPU 30 determines whether or not the total data size of the relay point information that has been acquired by the relay point information acquisition section 54 is within the predetermined data size. In a case in which the total data size of the relay point information is within the predetermined data size, the determination of step S106 is affirmative, and the processing transitions to step S110. Further, in a case in which the total data size of the relay point information exceeds the predetermined data size, the determination of step S106 is negative, and the processing transitions to step S108.

At step S108, the CPU 30 deletes a portion of the relay point information. More specifically, the relay point information is deleted in order from relay point information having the lowest degree of priority. For example, if the total data size of the relay point information exceeds the predetermined data size even in a case in which the relay point information having the lowest degree of priority has been deleted, relay point information having a next lowest degree of priority is deleted. Namely, the CPU 30 deletes the relay point information until the total data size of the relay point information is within the predetermined data size. Then, the processing transitions to step S110.

At step S110, the CPU 30 sets the virtual line. More specifically, the CPU 30 sets a virtual line connecting the relay points included in the relay point information that has been acquired by the relay point information acquisition section 54. It should be noted that, although the virtual line is set from a current position of the vehicle up to the planned path change point, the virtual line may be set up to a relay point further beyond the planned path change point. Further, the relay point information that has been deleted at step S108 is not reflected in the setting of the virtual line.

At step S112, the CPU 30 displays the image. More specifically, by the functionality of the image display section 58, the CPU 30 displays the image M1 in an animation so as to be directed toward the relay point along the imaginary line as viewed from the occupant, as illustrated in FIG. 5. Then, the CPU 30 ends the image display processing.

As described above, in the vehicle display control device 28 according to the present exemplary embodiment, the image M1 directed toward the planned path change point is displayed so as to be superimposed in the display region V3 provided in front of the occupant. This enables the occupant to recognize the planned path change point.

Further, in the present exemplary embodiment, since the image M1 is displayed, so as to be superimposed, so as to be directed toward the planned path change point along the imaginary line connecting the plural relay points that have been set at intervals along the planned travel route, the occupant can intuitively recognize the route to the planned travel route.

Moreover, in the present exemplary embodiment, since the total data size of the relay point information does not exceed the predetermined data size, other information processing performed at the vehicle is not affected.

Furthermore, in the present exemplary embodiment, since the relay point information acquisition section 54 deletes the relay point information in order from the relay point information having the lowest degree of priority, deletion of important information for displaying the image M1 can be suppressed. As a result, even in a case in which a portion of the relay point information has been deleted, the animation of the image M1 can be displayed correctly.

Further, in the present exemplary embodiment, the relay point information for before and after the planned path change point is set so as to be less likely to be deleted. This enables the accurate image M1 to be reliably displayed before and after the planned path change point.

Moreover, in the present exemplary embodiment, since the image M1 is projected onto the windshield glass 18, the occupant can recognize the route to the planned path change point without significantly moving their line of sight, which is directed toward the front of the vehicle.

Although explanation has been provided above regarding the vehicle display control device 28 according to the exemplary embodiment, it will be obvious that various embodiments may be implemented within a range that does not depart from the spirit of the present disclosure. For example, in the above-described exemplary embodiment, although the image M1 is displayed substantially in an arrow shape as illustrated in FIG. 5, there is no limitation thereto, and the image may be displayed in another shape. Further, although two of the image M1 are displayed in FIG. 5, there is no limitation thereto, and three or more of the image M1 may be displayed, or only one of the image M1 may be displayed.

Furthermore, in the above-described exemplary embodiment, although a configuration is provided in which one item of relay point information is set for the link L1 and the relay point N1 in FIG. 4, there is no limitation thereto. For example, a configuration may be adopted in which one item of relay point information is set for the relay point N1. In this case, the relay point information acquisition section 54 acquires information for the relay points N1 to N5. Further, the image display section 58 may display the image along an imaginary line connecting the relay points N1 to N5.

Moreover, in the above-described exemplary embodiment, although explanation has been provided regarding a configuration in which information is displayed so as to be superimposed in the display region V3 of the third display section 26, there is no limitation thereto. For example, a configuration may be adopted in which information is displayed so as to be superimposed in the display region V1 of the first display section 24 or in the display region V2 of the second display section 25. In this case, the information is displayed so as to be superimposed on an image of a periphery of the vehicle 12 that has been captured by a front camera or the like.

Furthermore, the processing executed by the CPU 30 reading and executing the programs in the above-described exemplary embodiment may be executed by various types of processors other than the CPU 30. Such processors include programmable logic devices (PLD) that allow circuit configuration to be modified post-manufacture, such as a field-programmable gate array (FPGA) or the like, and dedicated electric circuits, which are processors including a circuit configuration that has been custom-designed to execute specific processing, such as an application specific integrated circuit (ASIC) or the like. Further, the above-described processing may be executed by any one of these various types of processors, or by a combination of two or more of the same type or different types of processors, and may be executed, for example, by plural FPGAs, a combination of a CPU and an FPGA, or the like. Furthermore, the hardware structure of these various types of processors is, more specifically, an electric circuit combining circuit elements such as semiconductor elements or the like.

Further, in the above-described exemplary embodiment, although a configuration is provided in which various data is stored in the storage 36, there is no limitation thereto. For example, a non-transitory recording medium such as a compact disc (CD), a digital versatile disc (DVD), a universal serial bus (USB) memory, or the like may serve as a storage section. In such a case, the various programs, data, and the like are stored on these recording media.

Moreover, the flow of processing explained in the above-described exemplary embodiment is an example, and unnecessary steps may be eliminated, new steps may be added, or the processing order may be rearranged within a range that does not depart from the spirit of the present disclosure.

What is claimed is:

1. A vehicle display control device comprising a processor, the processor being configured to:
   acquire relay point information related to a plurality of relay points that have been set at intervals along a planned travel route of a vehicle;
   display, so as to be superimposed on a foreground in a display region provided in front of an occupant, an image directed toward a planned path change point along an imaginary line connecting the relay points;
   set a degree of priority of relay point information for relay points immediately before and after the planned path change point to be higher than other relay points; and
   delete a portion of the relay point information in a case in which a total size of the acquired relay point information exceeds a predetermined data size, and delete the relay point information in order from relay point information having a lowest degree of priority.

2. The vehicle display control device according to claim 1, wherein the processor is configured to delete a portion of the relay point information in a case in which a total data size of the acquired relay point information exceeds a predetermined data size.

3. The vehicle display control device according to claim 2, wherein the processor is configured to:
   set degrees of priority of the acquired relay point information; and
   delete the relay point information in order from relay point information having a lowest degree of priority.

4. The vehicle display control device according to claim 1, wherein the display region is a portion of a windshield glass onto which the image is projected by a head-up display device.

5. A vehicle display control system comprising:
   the vehicle display control device according to claim 1; and
   a display device that displays the image in the display region.

6. A vehicle comprising the vehicle display control system according to claim 5.

7. A vehicle display control method comprising, by a processor:

acquiring relay point information related to a plurality of relay points that have been set at intervals along a planned travel route of a vehicle; and displaying, so as to be superimposed on a foreground in a display region provided in front of an occupant, an image directed toward a planned path change point along an imaginary line connecting the relay points.

8. A non-transitory storage medium storing a program instructions that are executable by a computer to cause the computer to perform processing, the processing comprising:

acquiring relay point information related to a plurality of relay points that have been set at intervals along a planned travel route of a vehicle;

displaying, so as to be superimposed on a foreground in a display region provided in front of an occupant, an image directed toward a planned path change point along an imaginary line connecting the relay points;

setting a degree of priority of relay point information for relay points immediately before and after the planned path change point to be higher than other relay points; and deleting a portion of the relay point information in a case in which a total size of the acquired relay point information exceeds a predetermined data size, and delete the relay point information in order from relay point information having a lowest degree of priority.

* * * * *